United States Patent
Hoffman (10) Patent No.: US 12,153,434 B2
(45) Date of Patent: Nov. 26, 2024

(54) LOCAL AREA MAPPING FOR A ROBOT LAWNMOWER

(71) Applicant: POSITEC POWER TOOLS (SUZHOU) CO., LTD., Jiangsu (CN)

(72) Inventor: John Hoffman, Houghton, MI (US)

(73) Assignee: POSITEC POWER TOOLS (SUZHOU) CO., LTD., Jiangsu (CN)

( * ) Notice: Subject to any disclaimer, the term of this patent is extended or adjusted under 35 U.S.C. 154(b) by 205 days.

(21) Appl. No.: 17/835,697

(22) Filed: Jun. 8, 2022

(65) Prior Publication Data

US 2023/0400857 A1    Dec. 14, 2023

(51) Int. Cl.
*G05D 1/00* (2006.01)
*A01D 34/00* (2006.01)
*A01D 101/00* (2006.01)

(52) U.S. Cl.
CPC ......... *G05D 1/0214* (2013.01); *A01D 34/008* (2013.01); *G05D 1/0219* (2013.01); *G05D 1/0246* (2013.01); *G05D 1/0274* (2013.01); *A01D 2101/00* (2013.01)

(58) Field of Classification Search
CPC .. G05D 1/0214; G05D 1/0219; G05D 1/0246; G05D 1/0274; A01D 34/008; A01D 2101/00
USPC .......................................................... 701/26
See application file for complete search history.

(56) References Cited

U.S. PATENT DOCUMENTS

| | | | | |
|---|---|---|---|---|
| 2014/0102062 | A1* | 4/2014 | Sandin | G05D 1/0225 901/1 |
| 2020/0233413 | A1* | 7/2020 | Einecke | G05D 1/0219 |
| 2021/0018927 | A1* | 1/2021 | Ackerman | G05D 1/0278 |
| 2022/0322602 | A1* | 10/2022 | Mårtensson | G05D 1/0225 |

FOREIGN PATENT DOCUMENTS

| | | | |
|---|---|---|---|
| KR | 20100032488 A | * | 3/2010 |
| WO | 2021164738 A1 | | 8/2021 |

OTHER PUBLICATIONS

International Search Report and Written Opinion issued Aug. 8, 2023 in corresponding PCT application No. PCT/IB2023/055899, 10 pages.

* cited by examiner

*Primary Examiner* — Muhammad Shafi
(74) *Attorney, Agent, or Firm* — Lee & Hayes, P.C.

(57) ABSTRACT

A robot lawnmower and method for controlling the robot lawnmower based on the generation of a local map. The method including receiving an image from an imaging sensor onboard the robot lawnmower, the image including an area of ground in an upcoming path, applying a semantic segmentation algorithm to produce a segmented image from the received image, the segmented image including regions corresponding to features in the image, applying a perspective transform to the segmented image to obtain an overhead view transformed image, wherein the regions are preserved in the transformed image, determining, from the transformed image, positions of the regions relative to the current position of the robot lawnmower, plotting a local map of the environment of the robot lawnmower based on positions of the regions relative to a current position of the robot lawnmower; and controlling the robot lawnmower to navigate a lawn area using the local map.

18 Claims, 5 Drawing Sheets

LOCAL AREA MAPPING FOR A ROBOT LAWNMOWER

TECHNICAL FIELD

The present application relates to an apparatus, system, and method for autonomously controlling a robot lawnmower.

BACKGROUND

A robot or robotic lawnmower is an autonomous robot configured to cut grass on a lawn or field. Having a robot lawnmower removes the need for a human to cut the grass themselves, which can be a mundane and burdensome task.

Figure 1:
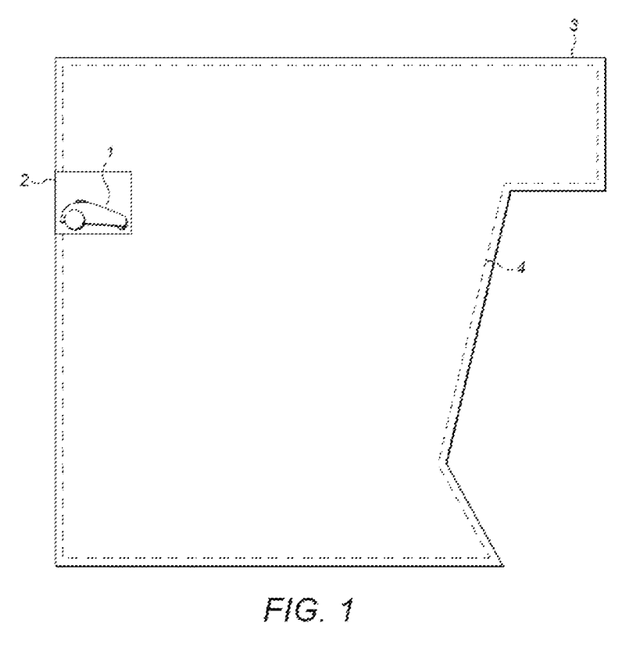
FIG. 1 is a schematic diagram illustrating an example of a lawn area in which a robot lawnmower may operate.

FIG. 1 shows an example of a lawn area in which a robot lawnmower may operate. The robot lawnmower 1 cuts grass within a lawn area 3 designated by a boundary or guide wire 4. The boundary or guide wire 4 is required to be physically installed prior to activating the robot lawnmower 1. The robot lawnmower 1 detects the boundary wire 4 and changes course, usually in a random direction, to avoid it.

Robot lawnmowers may include several sensors for use in detecting obstacles. These sensors may be laser or radar based sensors, for example. Similarly, robot lawnmowers may rely on satellite communication to navigate around the lawn area, and may include radio-sensors for navigating to a charging station. In FIG. 1, a charging station 2 is located at the periphery of the lawn area 3.

There is however, a balance that needs to be struck between the complexity of the robot lawnmower and its relative capabilities. Robot lawnmowers that include different types of sensors or otherwise include more complex systems are often more expensive. There is thus a need to provide a robot lawnmower that can function efficiently and effectively, but that does not require overly-complex systems and sensors.

SUMMARY

This summary is provided to introduce a selection of concepts in a simplified form that are further described below in the Detailed Description.

In a first aspect, the present disclosure provides a computer-implemented method of controlling a robot lawnmower, the method comprising: receiving an image from a imaging sensor on-board a robot lawnmower, the image including an area of ground in an upcoming path of the robot lawnmower, applying a semantic segmentation algorithm to produce a segmented image from the received image, the segmented image including regions corresponding to features in the image, applying a perspective transform to the segmented image to obtain an overhead-view transformed image, wherein the regions are preserved in the transformed image, determining, from the transformed image, positions of the regions relative to the current position of the robot lawnmower, plotting a local map of the environment of the robot lawnmower based on positions of the regions relative to a current position of the robot lawnmower; and controlling the robot lawnmower to navigate a lawn area using the local map.

The local map provides the robot lawnmower with data relating to the position of regions and features in the physical environment relative to the position of the robot lawnmower, such that it can be controlled to move towards or away from the regions and features.

The regions may include one or more regions including grass, and one or more regions including non-grass features. By classifying regions into two classes, one of grass and one of not-grass, the robot lawnmower is controlled to avoid regions of non-grass and cut regions of grass.

The non-grass features may include one or more of an obstacle, hazard and/or boundary of a lawn area. The regions of non-grass may thus be further classified to identify a type of non-grass feature. The control of the robot lawnmower may be different based on its proximity with different types of non-grass features.

Further, the local map may be size-limited according to a threshold distance from the current position of the robot lawnmower, such that the local map includes regions that are a distance from the current position of the robot lawnmower that is below the threshold distance. Said regions within the threshold distance may include one or more regions including grass, and one or more regions including non-grass features and the non-grass features may include one or more of an obstacle, hazard, and/or boundary of a lawn area.

Applying a threshold distance to the size of the local map limits the memory requirements for storing the local map in a memory of the robot lawnmower, whilst maintaining a map of the regions and features which are most proximate to the current position of the robot lawnmower. This is more efficient than saving and storing a larger map.

The plotting the local map may further include: obtaining a previous iteration of the local map, plotted using data from previously received images, and adding, to the previous iteration of the local map, one or more regions, from the transformed image corresponding to the received image.

The method is thus iterative such that, with each capture of a new image from the imaging sensor of the robot lawnmower, the local map is updated with regions segmented from the new image. The previous iteration of the local map is also updated with respect to the updated positions of regions contained therein, with respect to an updated position of the robot lawnmower. This beneficially keeps the local map up to date with respect to the most recently received image, to better form the control of the robot lawnmower in real or near-real time.

In at least one embodiment, said plotting the local map may consider that the local map is size-limited according to a threshold distance from the current position of the robot lawnmower, such that the local map includes regions that are a distance from the current position of the robot lawnmower that is below the threshold distance. Said regions within the threshold distance may include one or more regions including grass, and one or more regions including non-grass features and the non-grass features may include one or more of an obstacle, hazard, and/or boundary of a lawn area.

The plotting the local map may further include: deleting a portion of the previous iteration of the local map corresponding to one or more regions that are a distance from the current position of the robot lawnmower that is greater than a threshold distance, and adding, to the previous iteration of the local map, one or more regions, from the transformed image corresponding to the received image, having a distance from the current position of the robot lawnmower that is less than the threshold distance. This step of deleting may be used in combination with any of the other herein described method steps.

Applying a distance threshold to features or regions included in a previous iteration of the local map limits the memory requirements for storing the local map in a memory of the robot lawnmower, whilst maintaining a map of the regions and features which are most proximate to the current position of the robot lawnmower. This is more efficient than saving and storing a larger map. Portions of the local map which perhaps were historically proximate to the robot lawnmower but are now further away, and beyond the distance threshold, may be considered less critical to the control of the robot lawnmower. Thus, deleting regions or features of the local map which are further than a distance threshold away from the relative position of the robot lawnmower frees memory for more regions and features to be added from the most recently received image.

The plotting the local map may further include: recording a number of previous images used to plot the previous iteration of the local map, comparing the recorded number of images to a maximum image number; and when the recorded number of images used to plot the previous iteration of the local map is equal to the maximum image number: upon receiving the image from the imaging sensor, deleting a portion of the previous iteration of the local map corresponding to an oldest of the previous images; and adding, to the previous iteration of the local map, one or more regions, from the transformed image corresponding to the received image such that the local map the maximum image number is not exceeded. These steps may be further used in combination with any of the other herein described method steps.

Therefore, instead or in combination with using a distance threshold, the local map may be iteratively updated such that it only ever includes data from a finite number of consecutively taken images. The local map is limited to a maximum number of images such that, when the local map reaches the maximum number, any new images and data corresponding thereto effectively replace the oldest image and data corresponding thereto in the local map. The local map can thus be considered to be formed from data of a sliding window of captured images, wherein the sliding window extends from the most recently captured image to an image a maximum threshold number of images away in the sequence of consecutive images.

Keeping the number of images limited in this way again limits the memory requirements for storing the local map in a memory of the robot lawnmower, whilst maintaining a map of the regions and features which are most proximate to the current position of the robot lawnmower. This is more efficient than saving and storing a larger map.

Determining, from the transformed image, the positions of the regions relative to the current position of the robot lawnmower may further include: processing the transformed image with a VSLAM algorithm to obtain the positions of the regions of the transformed image, relative to the current position of the robot lawnmower. This step of determining may be used in combination with any of the other herein described method steps.

The method may further include: receiving one or more additional images from the imaging sensor on-board the robot lawnmower, and updating the local map with respect to the one or more additional images.

The local map may be generated from an initial image captured at the start of each session, whereby a session corresponds to a period in which the robot lawnmower is active. The initial image provides the first input for generating the local map. The local map may then be built on using further consecutively captured images as the robot lawnmower moves. The further images may be captured periodically according to the frame rate of the imaging sensor.

The method may further comprise obtaining additional data relating to the motion of the robot lawnmower; and updating the positions of the regions in the local map relative to the current position of the robot lawnmower based on the additional data. This step of obtaining additional data may be used in combination with any of the other herein described method steps.

The local map may thus be updated from two or more sources of information, wherein one source is the received image and another source is the additional data. Using multiple sources of information in this way makes the plotting of the local map more reliable.

The additional data may include additional sensor data from one or more additional sensors.

The additional sensor data may further include one or more of: odometry data, IMU data and GPS data. This data may be received from an odometry sensor, an inertial measurement unit (IMU), a GPS sensor or the like. Optical sensors may also be used to detect parameters such as the distance, speed and position of the robot lawnmower, absolutely or relative to some region or feature.

Updating the positions of the regions in the local map relative to the current position of the robot lawnmower based on the additional data may comprise: for each region in the local map: obtaining a previous position of the region from the local map; and modifying the previous position of the region based on the additional sensor data to determine an updated position of the region.

The additional data may include region tracking data for one or more regions present in the received image.

The method may further comprise generating the region tracking data for the one or more regions present in the received image, by: identifying the one or more regions in one or more previously received images; tracking the one or more regions through the one or more previously received images and the received image to determine a tracking path for each of the one or more regions.

The method may further comprise extrapolating the tracking path of the one or more regions when the one or more regions are no longer present in a subsequently received image; and updating the position of the one or more regions in the local map relative to the current position of the robot lawnmower based on the extrapolated tracking path.

The tracking of the regions consecutively received images provides additional data to the regions obtained via the image segmentation. In particular, regions tracked through multiple images may exhibit apparent motion through the images based on the motion of the robot lawnmower. This apparent motion may be tracked using a feature-tracking algorithm to form the extrapolated tracking path. Based on parameters such as the time since capture of the received image, and the speed of the robot lawnmower, the extrapolated tracking path may be used to reposition the tracked one or more regions in the local map. Thus, it is possible to update the position of regions in the local map even once they are out of the field of view of the imaging sensor of the robot lawnmower.

Updating positions of the regions in the local map relative to the current position of the robot lawnmower based on the additional data may be performed at a higher frequency than updating positions of the regions in the local map relative to the current position of the robot lawnmower based on the received image.

This means that additional data such as additional sensor data and/or region tracking data may be used to update the local map more regularly than consecutively received images are used to update the local map. This reduces the computational burden of image processing, whilst still allowing the robot lawnmower to navigate safely around the lawn area, avoiding obstacles and the like, based on a regularly updated local map. Furthermore, using the additional data enables updating of the local map even when regions are not in the field of view of the imaging sensor. Thus, positions of regions such as obstacles or hazards in the vicinity of the robot lawnmower may still be accurately updated even if these regions are not in the field of view of the imaging sensor.

It is less computationally intensive to obtain and use additional sensor data, such as odometry and IMU data, to update the position of regions or features in the local map, than it is to repeat the process of capturing, receiving, and processing images to update the local map. Thus, in order to maximise computational efficiency, and reduce the need for complex hardware, the method preferably works on the basis that the image-update rate is relatively slow, whilst the sensor-update rate is relatively fast. This means that the local map is updated using images less regularly than it is updated using sensor data. The update of the local map using sensor data may initially start with the most recently updated local map using the most recently received image, and then predict or otherwise update the relative position of regions and features in the local map based on detected parameters of the robot lawnmower, such as speed, direction, acceleration and the like, obtained from the additional sensors. There may be one or more updates using the additional sensors per every update using the received image. Once a further image is received, the local map may then be updated using the further image such that the method may then repeat.

The method of the first aspect may be repeated periodically with respect to a plurality of received images. This step of periodically updating the local map may be used in combination with any of the other herein described method steps.

The method may include capturing the image.

Controlling the robot lawnmower to navigate a lawn area using the local map may comprise accessing the local map; and controlling the robot lawnmower to navigate the lawn area according to the positions of the regions indicated by the local map. This step of controlling the robot lawnmower to navigate a lawn area may be used in combination with any of the other herein described method steps.

The robot lawnmower may thus be controlled to turn towards and engage/cut regions of grass, and/or avoid regions of non-grass such as boundaries, hazards and obstacles. The robot lawnmower is controlled based on the position of these features relative to the position of the robot lawnmower as indicated by the local map.

Controlling the robot lawnmower to navigate the lawn area according to the positions of the regions indicated by the local map may comprise: controlling one or more actuation mechanisms of the robot lawnmower to cause the robot lawnmower to move to navigate the lawn area.

The actuation mechanism may be any suitable mechanism, including one or more motors, engines, wheels and the like.

In a second aspect, the present disclosure provides a robot lawnmower comprising one or more actuation mechanisms, an imaging sensor, a memory module, and a control module including a processor communicatively coupled to the imaging sensor and the memory module, wherein the processor is configured to perform the method of the first aspect described above.

The imaging sensor may be a camera.

The camera may be configured to capture wide-angle images using a field of view of over 100 degrees.

The camera having a field of view of 130 degrees.

The robot lawnmower may further comprise one or more additional sensors communicatively coupled to the processor, the one or more additional sensors being configured to provide data relating to at least one of: a speed of the robot lawnmower; a bearing of the robot lawnmower; an orientation of the robot lawnmower; a distance travelled by the robot lawnmower; an acceleration of the robot lawnmower; and a distance from the robot lawnmower to one or more obstacles in the surroundings of the robot lawnmower.

The control module may be configured to communicate with an external server to perform the method according to the first aspect. By communicating with an external server, complex hardware and memory is not required on the robot lawnmower itself. The robot lawnmower may communicate with the external server via any suitable communication method. For example, the robot lawnmower may communicate with the server wirelessly, over the internet via a wireless connection.

In a third aspect, the present disclosure includes a computer readable medium having instructions stored thereon, which, when executed by a processor, cause the processor to perform the method of the first aspect.

In a fourth aspect, the present disclosure includes a computer program, which, when executed by a processor, causes the processor to perform the method of the first aspect.

Parts of the method described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

BRIEF DESCRIPTION OF DRAWINGS

Embodiments of the invention will be described, by way of example, with reference to the following drawings, in which.

DETAILED DESCRIPTION

Embodiments of the invention described below relate to an apparatus and method for controlling a small autonomous vehicle such as a robot lawnmower.

Figure 2:
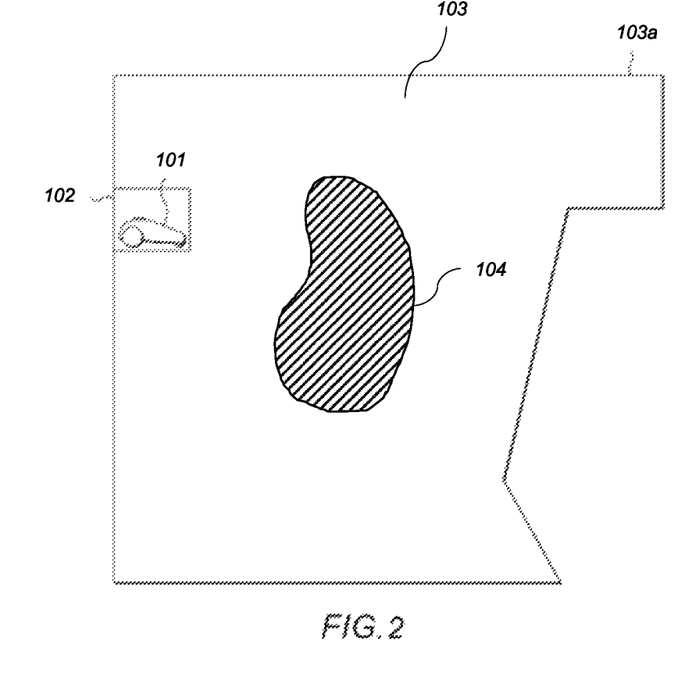
FIG. 2 is a schematic diagram illustrating an example of a lawn area in which the robot lawnmower according to an embodiment of the invention may operate.

FIG. 2 shows a schematic overview of a robot lawnmower 101 according to an embodiment of the invention, within a typical lawn area 103. The lawn area 103 includes lawn (grass) and may include obstacles/hazards 104 contained therein. The robot lawnmower 101 is configured to cut the lawn (grass) within the lawn area 103, without exiting the lawn area 103 and without hitting/entering any obstacles/hazards 104. When the robot lawnmower 101 is inactive, it is configured to charge at a charging station 102. The lawn area 103 is not required to be delimited by a guide wire or boundary wire, because the robot lawnmower 101 is able to navigate the lawn area 103 without such features. The lawn area 103 is defined by a boundary 103a. The boundary 103a refers to the actual boundary of the lawn.

Figure 3:
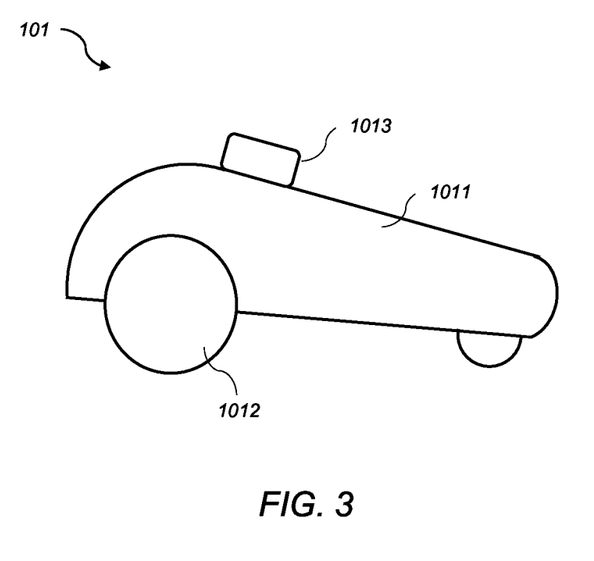
FIG. 3 is a schematic diagram illustrating the robot lawnmower according to an embodiment of the invention.

FIG. 3 shows a schematic diagram of the robot lawnmower 101 according to the invention. The robot lawnmower 101 includes a body 1011, wheels 1012, a power source (not shown), a grass-cutting instrument (not shown), and a control module 1013. The robot lawnmower is preferably a differential drive robot, which allows the robot to turn with a turning radius of zero. This allows the robot lawnmower to turn in any scenario and helps to avoid the robot lawnmower 101 becoming stuck. The control module 1013 includes a computer, or processor configured to perform computations and execute software, and a memory. The control module 1013 includes or is otherwise in communication with one or more sensors. The one or more sensors are configured to provide the control module 1013 with information regarding lawnmower parameters, such as absolute/relative position of the robot lawnmower 101; absolute/relative position of obstacles and/or lawn area boundaries; absolute/relative position of the charging station 102; absolute/relative position of lawn within the lawn area 103 that has been recently cut or mown by the robot lawnmower 101; humidity; temperature; robot lawnmower kinematics; robot lawnmower power; and the like. Such sensors may include an Inertial Measurement Unit (IMU), a cadence sensor, a speed sensor, an accelerometer, a GPS sensor, an ultrasonic sensor, a radar, an infrared sensor, a laser-based sensor, LIDAR and the like. It is to be understood that the control module may include or be communicatively coupled with any or none of these types of sensors. The control module 1013 of the robot lawnmower 101 may further be configured to include and/or communicate with an imaging sensor such as a camera device. The imaging sensor is configured to capture images of the environment of the robot lawnmower, preferably in the upcoming forward path of the robot lawnmower. As will be understood, the imaging sensor has parameters such as a field of view and a maximum frame rate. A wide-angle camera device is preferred, such that the field of view includes at least partial side views as well as a forward or upcoming path view. The imaging sensor may be a Sony™ IMX 327 or IMX 390, for example, with a field of view of 130 degrees.

The imaging sensor is configured to routinely capture images corresponding to a forward view of the robot lawnmower 101, such that a stream of images illustrating the environment in front of the robot lawnmower 101, or otherwise in the upcoming path of the robot lawnmower 101, are captured. It is to be understood that, although a forward view is referred to here, a wide angle field of view may include images including a side view or rear view of the robot lawnmower.

The control module 1013 is configured to process each captured image using a semantic segmentation algorithm, to segment the captured image into areas or regions and identify these areas or regions as including grass or not grass. Further similar processing may be performed to determine the presence of obstacles/hazards or boundaries within a captured image. The semantic segmentation algorithm is applied to each captured image in the stream of captured images via software stored on a local memory coupled with the control module 1013. It is however to be understood that any one or more computer-implemented processes discussed herein may be performed remotely via a network, server or the like.

The semantic segmentation algorithm may be trained according to various techniques as will be understood. The semantic segmentation algorithm is trained to classify segmented regions of an image between areas of grass and non-grass. Training may further aid in classifying regions of the image as 'obstacles/hazards'.

Application of the semantic segmentation algorithm on a captured image results in a segmented image, whereby the segmented image is split into different areas or regions. The areas or regions are then classified. As such, a stream of consecutively captured images are fed through the semantic segmentation algorithm to obtain a series of segmented images which each have classified regions.

The control module 1013 is configured to further process the segmented images to build a local map of the environment of the robot lawnmower 101. The local map is produced by visual simultaneous localization and mapping (VSLAM) algorithms, such as the Gmapping algorithm for example. Effectively, the series of segmented images undergo a perspective transformation and are stitched together to create an overhead-view map. The process of creating the local map is set out below with reference to FIG. 4.

Figure 4:
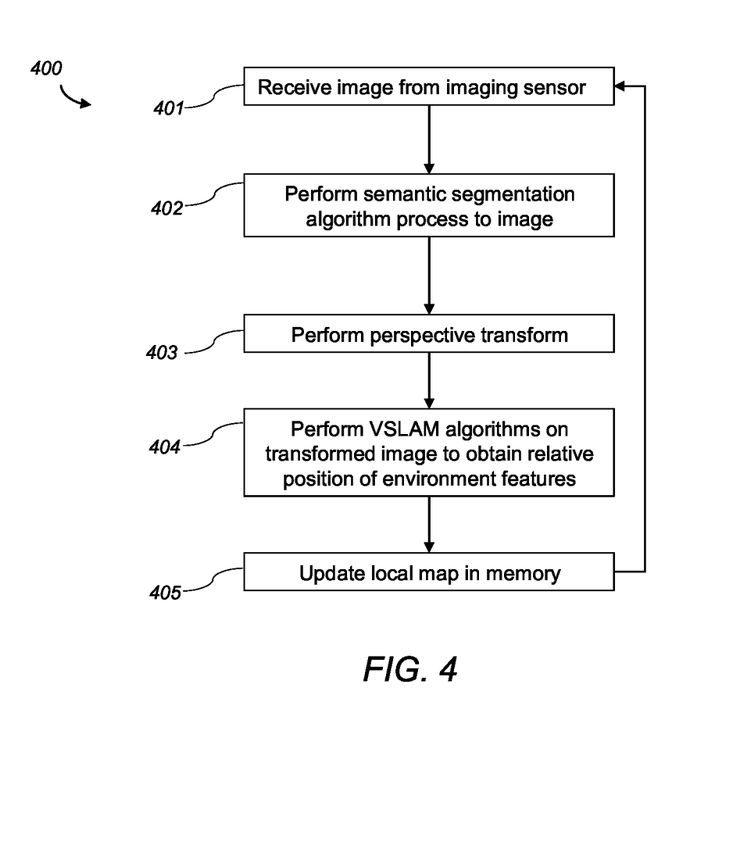
FIG. 4 is a flow diagram illustrating a method of updating a local map of the environment of the robot lawnmower according to an embodiment of the present invention.

FIG. 4 shows a flow diagram 400 detailing a method of producing the local map. In a first step 401, an image is received from the imaging sensor. This image corresponds to a single frame within the stream of images routinely captured by the imaging sensor.

In a second step 402, the semantic segmentation algorithm process explained above is applied to the received image to produce a segmented image. The image is then classified to determine the features contained in each segment of the segmented image.

In a third step 403, a perspective transform is performed on the segmented image, such that the segmented image is transformed into a transformed image showing an overhead view of the environment displayed in the segmented image.

In a fourth step 404, one or more VSLAM algorithms are applied to the transformed image to obtain and track the position and orientation of classified features within the transformed image. These features include areas of grass, areas of no grass and obstacles/hazards for example.

In a fifth step 405, the local map is updated in memory with the positions and orientations of the features identified in the fourth step 404. The transformed image obtained from steps 403 and 404 is effectively stitched into an existing local map. The existing local map includes previously transformed images that collectively make up the local map. If there is no existing local map, because for instance, no local map is presently stored in local memory, the transformed image is used to create a first portion of the local map.

The local map comprises classified features originating from a plurality of consecutively captured images. In an example, the local map is produced and maintained such that the robot lawnmower 101 always appears at the origin or centre of the local map. In this example, the position and orientation of features are updated periodically or continuously in the local map relative to the current position of the robot lawnmower 101. In this example, further sensors may be used to detect and track odometry, and/or kinematics of the robot lawnmower 101, such that parameters such as speed, distance and direction of the robot lawnmower 101 are factored into the update of the local map. These further sensors and the data they produce may also be used to aid in the process of updating positions of features in the local map relative to an updated position of the robot lawnmower 101. The use of further sensors other than the imaging sensor to update the local map is explained in detail below.

The method 400 repeats for further images received from the imaging sensor, from the stream of consecutively captured images. In an example, each image is gathered at a frame rate of 3 Hz, although it is to be understood that any suitable frame rate may be used.

As noted above, specific regions/points in consecutive segmented images are tracked in the corresponding transformed images to determine the orientation and position of features of the environment, such as lawn, no lawn, and obstacles/hazards, relative to the orientation and position of the robot lawnmower 101. In order to reduce the computational burden of producing, maintaining, and storing the local map in local memory, the local map is limited to a predefined size. The local map is defined as a map that details the immediate environment of the robot lawnmower 101. The local map may thus be limited to the environment up to a finite distance or radius away from the robot lawnmower 101, whereby that distance or radius is less than the dimensions of the lawn area. The local map stored in the memory, or portions thereof, may be overwritten as the robot lawnmower 101 moves, or as newly transformed images are provided by the process 400, such that only the immediate environment on the robot lawnmower 101 is stored in the local map. By deleting areas of the local map that are greater than a distance threshold away from the current position of the robot lawnmower 101, and adding newly acquired features to the local map that are within, or lower than, a distance threshold away from the position of the robot lawnmower 101, the local map is maintained in that it only shows the immediate environment of the robot lawnmower 101. An advantage of this is that the need for a large memory is negated.

In an embodiment, the local map may be size-limited by the number of consecutive images stored to generate the local map at any given time. For example, the local map may comprise the N most recent transformed images, where N is a number between 2 and 50, for example. It is to be understood that the maximum number of images used to generate the local map may be any number selected based on the memory and computational capabilities of the robot lawnmower 101.

To further reduce computational burden, the frame rate of the imaging device may be limited, such that consecutive images are captured at a predetermined frame rate that is selected based on a desired mowing speed of the robot lawnmower 101. Similarly, the robot lawnmower 101 may be configured such that the speed of the robot lawnmower 101 does not exceed the frame rate of the imaging sensor and the corresponding time taken to run the VSLAM algorithm over each individual frame of the stream of images, to ensure that the local map is complete and does not include blank spots or mapping areas of no information. By maintaining a low robot lawnmower speed, the need for expensive imaging and processing equipment is reduced. The speed of the robot lawnmower may be between 0.25 and 0.5 m/s, for example.

Alternatively, the frame rate may be adjusted dynamically to compensate for changes in speed of the robot lawnmower 101.

Figure 5:
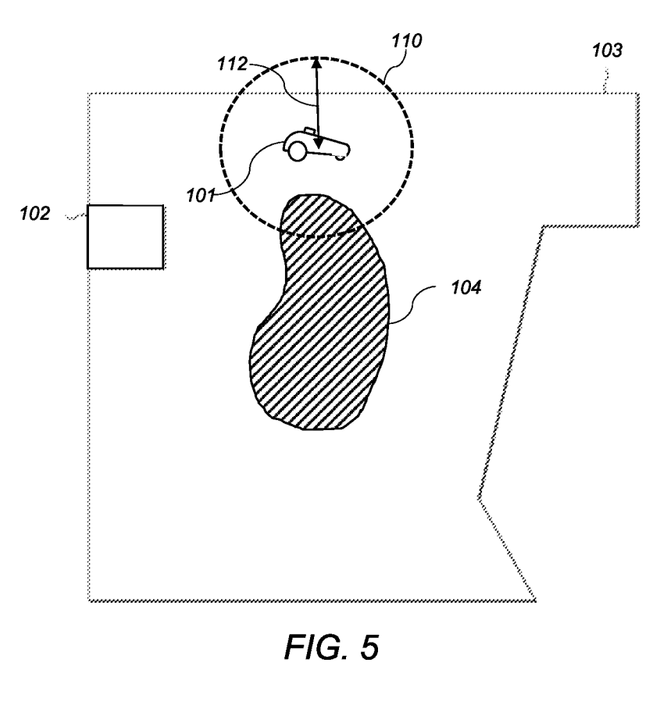
FIG. 5 is a schematic diagram illustrating an example of a lawn area in which the robot lawnmower according to an embodiment of the invention may operate, with a visual representation of the local map of the environment of the robot lawnmower; and Common reference numerals are used throughout the figures to indicate similar features.

A visual representation of the local map is provided in FIG. 5. FIG. 5 shows a similar schematic diagram to FIG. 2. In FIG. 5, the robot lawnmower 101 is on the lawn area 103. The local map is visually represented by a map area 110, defined by a maximum distance radius 112 from the current position of the robot lawnmower 101.

Although the local map 110 is illustrated as being circular, the local map 110 can be any shape. In one example, the local map 110 is formed from a series of images captured by the imaging sensor, wherein the imaging sensor is positioned such that its field of view includes a wide-angle view of the environment in front of the robot lawnmower 101, relative to the velocity of the robot lawnmower 101. For example, the field of view may be 130 degrees. Upon the robot lawnmower 101 moving forwards, and further images being captured in the series of images, the local map becomes substantially rectangular as a newly acquired transformed image is stitched in front of a previously acquired transformed image that forms part of the local map 110. The wide field of view of the imaging sensor provides images of the upcoming path of the robot lawnmower that arc to each side of the robot lawnmower. This means that the robot lawnmower effectively perceives a cone-shaped view of the world in front of it. Although images of the environment at each side of the robot lawnmower adjacent the front side are not captured, the wide field of view of previously captured images ensures that, when the local map is updated as new images are received, the local map includes grass and non-grass features such as boundaries and hazards that are in the environment of the sides of the robot lawnmower adjacent the front. The local map 110 is continually updated upon receiving a newly captured image. At the same time, transformed images which form part of the local map, and which contain features which are no longer in the vicinity or within a distance threshold of the robot lawnmower, are removed from the local map 110. In this way, the local map 110 does not increase in size passed a maximum size defined by the distance threshold.

In an example, the local map may be 0.5 to 2 square metres in size, whilst the imaging sensor may have a field of view of approximately 0.7 metres. As noted above, by maintaining the local map as a small size, by deleting and replacing portions of the local map at a distance from the robot lawnmower of more than a maximum distance threshold, there is no need to store a large map and thus memory requirements on the robot lawnmower 101 are reduced.

The control module 1013 of the robot lawnmower 101 may further utilise additional sensor data to compliment the above processes in forming and maintaining the local map 110. For example, the local map 110, and the positions of features such as boundaries, obstacles/hazards and lawn relative to the robot lawnmower 101 may be updated faster or more frequently than each iteration of capturing an image, transforming the image, and stitching the newly transformed image into the local map according to the process 400. In particular, the update of the local map by addition of a transformed image into the local map 110 is dependent on steps 401 to 405. These steps of the process are limited by the constraints of the computational devices and sensors used to carry out these steps. For example, the imaging sensor is limited by its frame rate, and the performance of the semantic segmentation algorithm and the VSLAM algorithm in forming the local map is limited by the processing power of the control module 1013. These constraints such as the frame rate are maintained at a nominally low/non-intensive value, so that the process 400 can be performed on less complex and smaller computers and computer processors. For example, the frame rate is maintained at one frame per second. This means that semantic segmentation and the process 400 only repeats once every second upon receiving a new image. This allows the semantic segmentation and process 400 to be performed on low-cost and small-size computer processors such as mobile-phone processors and the like.

Due to the process 400 being repeated at a low rate, the robot lawnmower can move between the capture and processing of consecutive images. This means that the robot lawnmower 101 may move between updates of the local map, meaning the local map becomes out of date with respect to the relative position of features such as boundaries and obstacles. To negate this problem, additional sensor data may be used to predict or update the local map and the position of features such as boundaries, obstacles/hazards and lawn relative to the robot lawnmower 101, starting from the most recently available version of the local map 110. In particular, odometry data from an odometry sensor, or speed/acceleration data from an IMU (inertial measurement unit) may be used to calculate a distance travelled by the robot lawnmower 101 since a most recent update of the local map 110. The position of features present in the local map 110 may then be recalculated by taking account of the measured distance that the robot lawnmower has travelled. Upon receiving an update to the local map 110, the positions of the features are adjusted according to the process 400.

Further additional sensor data may be employed to make the calculations regarding the positions of features such as boundaries, obstacles/hazards and lawn relative to the robot lawnmower 101 more accurate. For example, an IMU may be used in combination with odometry data to provide sensor redundancy. Using data from the IMU can help to eliminate drift exhibited in the odometry data, which may be caused by wheel-spin or the like. The IMU data can also be used in combination with the odometry data to determine the position of the robot lawnmower with respect to the features included in the local map, in between updates of the local map.

Although the above example discusses the use of IMU and odometry data, the invention is not limited to any particular type of additional sensor. As will be understood, other types of sensor such as infrared sensors, ultrasonic sensors, GPS systems or the like may be used in combination with the imaging sensor to formulate and maintain the local map 110 in between map updates by the process 400.

The additional sensors used to predict the location of the robot lawnmower between updates of the local map by the process 400, such as the IMU, are relatively low-cost and computationally efficient compared to the semantic segmentation of process 400 itself. By prioritising the application of such additional sensors for maintaining the local map and updating the relative proximity of features in the local map to the current position of the robot lawnmower, instead of using semantic segmentation and repeating the process 400 more frequently, the local map can be maintained at lower computational cost. This means that the robot lawnmower can be controlled more efficiently and with less complex hardware. The additional sensors may be used to maintain the local map in real-time, between updates of the local map from the process 400.

In an embodiment, further processing is performed on a portion of the local map 110 which no longer corresponds to the field of view of the imaging sensor. In particular, further processing may be performed by the control module 1013 to areas of the local map 1013 corresponding to the environment of the robot lawnmower 101 in the vicinity of each of a left and right side of the robot lawnmower 101 relative to the forward moving direction of the robot lawnmower 101. The right and left side of the robot lawnmower 101 may be outside of the field of view of the imaging sensor. However, due to the wide field of view of the imaging sensor, the environment of the robot lawnmower 101 in the vicinity of each of a left and right side of the robot lawnmower 101 is still mapped in the local map from one or more previously captured images, as the robot lawnmower moves forwards. As such, it is important that the local map 110 is maintained, including the locations of obstacles determined from the field of view, such that the relative positions of features on the map (e.g. obstacles either side of the robot lawnmower 101) are known to the robot lawnmower 101 such that they can be navigated by the robot lawnmower 101. In other words, the local map maintains the locations of potential obstacles relative to the robot lawnmower 101 such that the vehicle may use a its motion control mechanisms (e.g. based on odometry) to determine where it is having regard to each said feature on the map and to navigate past the or each feature without colliding with any such feature.

In an example, an additional processing step includes simulating, by the control module 1013, the position of objects in the field of each of the left side and right side of the robot lawnmower 101 in more detail. This additional processing step includes iteratively running a proportional-integral-derivative (PID) loop using Bresenham's algorithm on a feature that is present in consecutive segmented images. In this way the control function generates a tracking-profile for the particular feature whilst it is in the field of view of the imaging sensor, whereby the tracking profile of the feature can be extrapolated according once the feature is no longer in the field of view of the imaging sensor. The tracking profile can be used to determine an estimated distance to the feature once it is not in the field of view of the imaging sensor. This assists in the more precise location of features on the local map. This additional processing step may be regarded affording similar data to a LiDAR-based distance measurement to the feature, albeit not requiring additional hardware. Maintaining object locations on the local map enables the control module 1013 to monitor a boundary, hazard, or obstacle on one side of the robot lawnmower 101 without requiring expensive hardware. The locations of features on the local map can thus be used in combination with, or separately from the additional one or more sensors such as the IMU described above. In operation, the robot lawnmower 101 uses the local map to navigate, cut lawn, and avoid obstacles/hazards and boundaries. The local map is used to measure one or more distances from the current position of the robot lawnmower to features such as obstacles/hazards, so that the robot lawnmower can be controlled to either avoid or circumscribe these features. The local map may be used in combination with a path planning algorithm, as well as with further sensors such as Global Positioning System (GPS) sensors and/or odometry sensors.

When the robot lawnmower 101 is deployed in a lawn area 103, whereby the lawn area 103 is unknown to the robot lawnmower 101, the robot lawnmower 101 may navigate according to a path-planning algorithm. The path planning algorithm may be used to ensure that the robot lawnmower is able to safely and efficiently circumnavigate any obstacle/hazard or boundary in order to cut lawn in the lawn area 103.

In the described embodiments of the invention the control module 1013 may be implemented as any form of a computing and/or electronic device. It is to be understood that, although reference is made above to the control module 1013 of the robot lawnmower 101 being responsible for the method of image processing; the method of forming a local map; the method of simulating LiDAR; and the method of path planning; these methods may be performed or computed via interaction with an external server, computer or satellite in communication with the robot lawnmower 101.

The robot lawnmower 101 may form part of a system including the charging station 102 or any other entity, and the charging station 102 or other entity may communicate with the robot lawnmower 101 to control the robot lawnmower 101 or otherwise perform one or more of the method steps set out above.

The control module 1013 may include a computing and/or electronic device that may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

The methods described above may be performed using computer executable instructions that may be provided using any computer-readable media that is accessible by computing based device. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described above. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of controlling a robot lawnmower, the method comprising:
   receiving an image from an imaging sensor on-board the robot lawnmower, the image including an area of ground in an upcoming path of the robot lawnmower;
   applying a semantic segmentation algorithm to produce a segmented image from the received image, the segmented image including regions corresponding to features in the received image;
   applying a perspective transform to the segmented image to obtain an overhead-view transformed image, wherein the regions are preserved in the overhead-view transformed image;
   determining, from the overhead-view transformed image, positions of the regions relative to a current position of the robot lawnmower;
   plotting a local map of an environment of the robot lawnmower based on the positions of the regions relative to the current position of the robot lawnmower, wherein plotting the local map includes:
      obtaining a previous iteration of the local map, plotted using data from previously received images;
      adding, to the previous iteration of the local map, one or more first regions, from the overhead-view transformed image corresponding to the received image, having a distance from the current position of the robot lawnmower that is less than a threshold distance; and
      deleting a portion of the previous iteration of the local map corresponding to one or more second regions having a distance from the current position of the robot lawnmower that is greater than the threshold distance; and controlling the robot lawnmower to navigate a lawn area using the local map.

2. The method of claim 1, wherein the regions relative to the current position of the robot lawnmower include one or more third regions including non-grass features, and wherein the non-grass features include one or more of an obstacle, hazard or boundary of a lawn area.

3. The method of claim 1, wherein the local map is size-limited according to the threshold distance from the current position of the robot lawnmower.

4. The method of claim 1, wherein plotting the local map further includes:
recording a number of previous images used to plot the previous iteration of the local map;
comparing the recorded number of images to a maximum image number; and
when the recorded number of images used to plot the previous iteration of the local map is equal to the maximum image number:
upon receiving the image from the imaging sensor, deleting a portion of the previous iteration of the local map corresponding to an oldest of the previously received images; and
adding, to the previous iteration of the local map, one or more third regions, from the overhead-view transformed image corresponding to the received image, such that the maximum image number is not exceeded.

5. The method of claim 1, wherein determining, from the overhead-view transformed image, the positions of the regions relative to the current position of the robot lawnmower includes:
processing the overhead-view transformed image with a VSLAM algorithm to obtain the positions of the regions of the overhead-view transformed image, relative to the current position of the robot lawnmower.

6. The method of claim 1, further comprising:
obtaining additional data relating to a motion of the robot lawnmower; and
updating the positions of the regions in the local map relative to the current position of the robot lawnmower based on the additional data, wherein the additional data includes sensor data from one or more additional sensors, and wherein the sensor data includes one or more of: odometry data, IMU data, or GPS data.

7. The method of claim 6, wherein updating the positions of the regions in the local map relative to the current position of the robot lawnmower based on the additional data comprises:
for each region in the local map:
obtaining a previous position of a respective region from the local map; and
modifying the previous position of the respective region based on the additional sensor data to determine an updated position of the respective region.

8. The method of claim 6, wherein the additional data includes region tracking data for one or more third regions present in the received image.

9. The method of claim 8, further comprising:
generating the region tracking data for the one or more third regions present in the received image, by:
identifying the one or more third regions in one or more previously received images;
tracking the one or more third regions through the one or more previously received images and the received image to determine a tracking path for each of the one or more fourth regions.

10. The method of claim 9, further comprising:
extrapolating the tracking path of the one or more third regions when the one or more third regions are no longer present in a subsequently received image; and
updating one or more corresponding positions of the one or more third regions in the local map relative to the current position of the robot lawnmower based on the extrapolated tracking path.

11. The method of claim 6, wherein updating the positions of the regions in the local map relative to the current position of the robot lawnmower based on the additional data is performed at a higher frequency than updating the positions of the regions in the local map relative to the current position of the robot lawnmower based on the received image.

12. The method of claim 1, wherein controlling the robot lawnmower to navigate the lawn area using the local map comprises:
accessing the local map; and
controlling the robot lawnmower to navigate the lawn area according to the positions of the regions indicated by the local map.

13. The method of claim 12, wherein controlling the robot lawnmower to navigate the lawn area according to the positions of the regions indicated by the local map comprises:
controlling one or more actuation mechanisms of the robot lawnmower to cause the robot lawnmower to move to navigate the lawn area.

14. A method comprising:
receiving an image from an imaging sensor on-board a robot lawnmower, the image including an area of ground in an upcoming path of the robot lawnmower;
applying a semantic segmentation algorithm to produce a segmented image from the received image, the segmented image including regions corresponding to features in the received image;
applying a perspective transform to the segmented image to obtain an overhead-view transformed image, wherein the regions are preserved in the overhead-view transformed image;
determining, from the overhead-view transformed image, positions of the regions relative to a current position of the robot lawnmower;
plotting a local map of an environment of the robot lawnmower based on the positions of the regions relative to the current position of the robot lawnmower, wherein plotting the local map includes:
obtaining a previous iteration of the local map, plotted using data from previously received images; and
adding, to the previous iteration of the local map, one or more first regions, from the overhead-view transformed image corresponding to the received image;
recording a number of previous images used to plot the previous iteration of the local map;
comparing the recorded number of images to a maximum image number; and
when the recorded number of images used to plot the previous iteration of the local map is equal to the maximum image number:
upon receiving the image from the imaging sensor, deleting a portion of the previous iteration of the local map corresponding to an oldest of the previous images, wherein adding, to the previous iteration of the local map, the one or more first regions, from the overhead-view transformed image corresponding to the received image comprises: wherein adding, to the previous iteration of the local map, the one or more first regions, from the overhead-view transformed image corresponding to the received image, such that the maximum image number is not exceeded; and controlling the robot lawnmower to navigate a lawn area using the local map.

15. The computer readable medium of claim 14, wherein the regions relative to the current position of the robot lawnmower include one or more fourth regions including non-grass features, and wherein the non-grass features include one or more of an obstacle, hazard or boundary of a lawn area.

16. The computer readable medium of claim 14, wherein the local map is size-limited according to a threshold distance from the current position of the robot lawnmower.

17. The computer readable medium of claim 14, wherein the operations further comprise:

obtaining additional data relating to a motion of the robot lawnmower; and updating the positions of the regions in the local map relative to the current position of the robot lawnmower based on the additional data, wherein the additional data includes sensor data from one or more additional sensors, and wherein the sensor data includes one or more of: odometry data, IMU data, or GPS data.

18. A robot lawnmower comprising:

one or more actuation mechanisms;

an imaging sensor;

a memory module; and a control module including a processor communicatively coupled to the one or more actuation mechanisms, the imaging sensor, and the memory module, wherein the processor is configured to perform operations comprising:

receiving an image from an imaging sensor on-board the robot lawnmower, the image including an area of ground in an upcoming path of the robot lawnmower;

applying a semantic segmentation algorithm to produce a segmented image from the received image, the segmented image including regions corresponding to features in the received image;

applying a perspective transform to the segmented image to obtain an overhead-view transformed image, wherein the regions are preserved in the overhead-view transformed image;

determining, from the overhead-view transformed image, positions of the regions relative to a current position of the robot lawnmower;

plotting a local map of an environment of the robot lawnmower based on the positions of the regions relative to the current position of the robot lawnmower, wherein plotting the local map includes:

obtaining a previous iteration of the local map, plotted using data from previously received images;

adding, to the previous iteration of the local map, one or more first regions, from the overhead-view transformed image corresponding to the received image, having a distance from the current position of the robot lawnmower that is less than a threshold distance; and deleting a portion of the previous iteration of the local map corresponding to one or more second regions having a distance from the current position of the robot lawnmower that is greater than the threshold distance; and controlling the robot lawnmower to navigate a lawn area using the local map.

* * * * *